Figure 1:
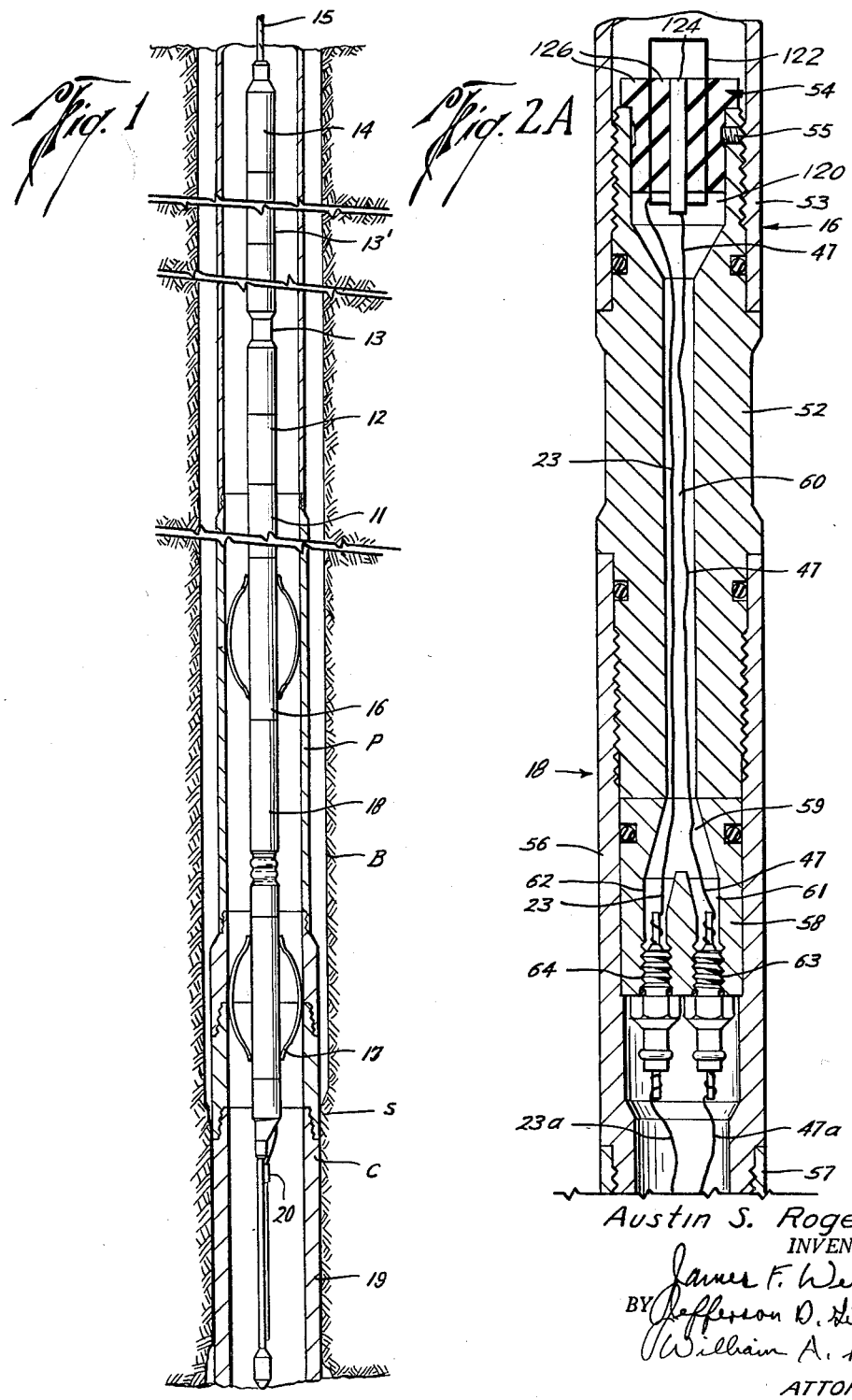

July 2, 1963     A. S. ROGERS     3,095,736
STUCK PIPE LOCATOR

Filed Oct. 21, 1959     4 Sheets-Sheet 1

Austin S. Rogers
INVENTOR.

BY James F. Weiler
Jefferson D. Giller &
William A. Stout
ATTORNEYS

July 2, 1963

A. S. ROGERS 3,095,736

STUCK PIPE LOCATOR

Filed Oct. 21, 1959

4 Sheets-Sheet 3

Austin S. Rogers
INVENTOR.

BY James F. Weiler
Jefferson D. Giller &
William A. Stout

ATTORNEYS

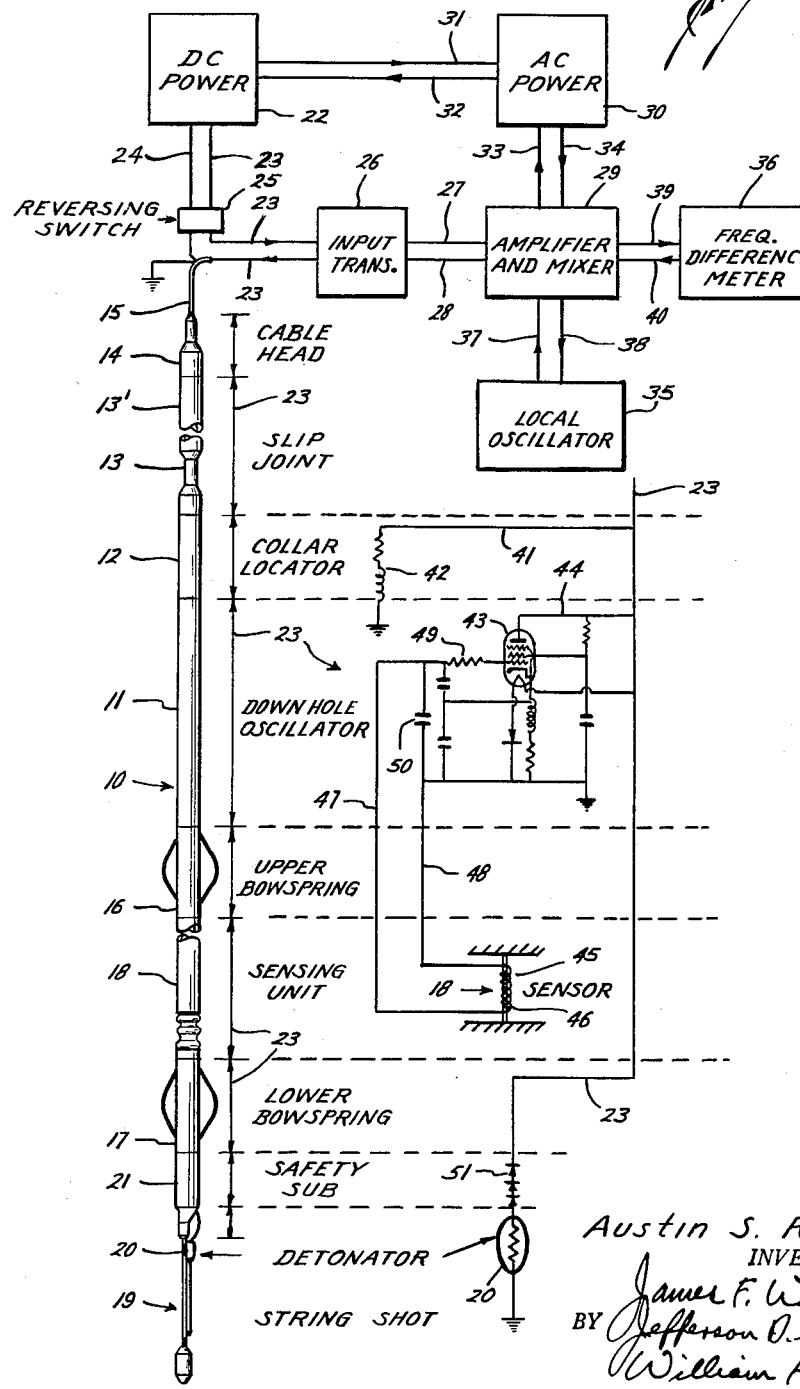

United States Patent Office 3,095,736
Patented July 2, 1963

3,095,736
STUCK PIPE LOCATOR
Austin S. Rogers, Houston, Tex., assignor to Houston Oil Field Material Company, Inc., Houston, Tex., a corporation of Delaware
Filed Oct. 21, 1959, Ser. No. 847,737
9 Claims. (Cl. 73—151)

The present invention relates to improvements in apparatus for locating the point at which pipe is stuck in a well bore as well as determining physical conditions of pipe in a well bore and forces effecting such conditions.

There are at present two general types of methods and apparatus used for determining where pipe is stuck in a well bore. One of these broadly is a magnetic method and apparatus in which a magnetic field is linked to a portion of the wall of pipe in the well bore, force is applied to the pipe, and the changes in the characteristics of the magnetic field are noted at the surface to give an indication of where the pipe is stuck in the well bore as well as other conditions of the pipe and forces in the well bore effecting such conditions. Such methods and apparatus are generally disclosed in the Bender Patents Nos. 2,686,039 and 2,814,019.

The second type includes generally fixing movable parts of electric control means to spaced points of the pipe and causing movement of the pipe which moves the movable parts by which the stuck point is indicated. The second type is generally disclosed in the Martin Patents Nos. 2,530,309 and 2,530,308 and the Brookes Patent No. 2,550,964.

While both of the above types of methods and apparatus are presently in widespread use, such methods and apparatus require a relative large movement of the pipe in the well bore in order to obtain an accurate reading as to the location of the stuck point of the pipe. Neither of these methods or apparatus has been satisfactory in determining the stuck point of drill collars, which are thick-walled sections of pipe located at the lower end of the drilling string just above the bit, in view of the fact that the force applied at the surface does not provide sufficient movement, either torque or tension, in the drill collars when stuck.

The present invention is directed to an improved magnetic apparatus for locating the stuck point of pipe which overcomes the disadvantages of the above mentioned methods and apparatus in the relatively very little movement of the pipe is required in order to give an accurate indication as to the stuck point of the pipe; for example, the stuck point of drill collars can readily and easily be determined by the apparatus and method of the present invention.

It is therefore an object of the present invention to provide an improved magnetic apparatus for determining the stuck point of pipe in a well bore in which very little movement of the pipe is required in order to make an accurate determination of the stuck point.

Yet a further object of the present invention is the provision of an improved magnetic instrument for determining the stuck point of drill collars in a well bore.

Yet a further object of the present invention is the provision of such apparatus in which minute stress, strain or load of pipe in a well bore may readily and easily be noted.

Still a further object of the present invention is the provision of apparatus for determining the stuck point of pipe in a well bore in which a highly sensitive rigid sensor element is fixedly secured to spaced points of pipe in the well bore, a magnetic field is applied to the sensor element, and force is applied to the pipe, the sensor element thus being subjected to the same stress, strain or load as the pipe and greatly affecting magnetic characteristics of the field with very little movement whereby an accurate indication of the stuck point is obtained at the surface.

A still further object of the present invention is the provision of such an apparatus for locating the stuck point of pipe in a well bore which attains very good results.

Still a further object of the present invention is the provision of such an apparatus for locating the stuck point of pipe in a well bore in which the indications are linear and either right or left torque and tension is indicated.

Still a further object of the present invention is the provision of an instrument for locating the stuck point of pipe in a well bore in which well fluid in the well bore is excluded from the instrument and the instrument is automatically hydrostatically balanced with respect to fluid pressure in the well bore.

Figure 2:
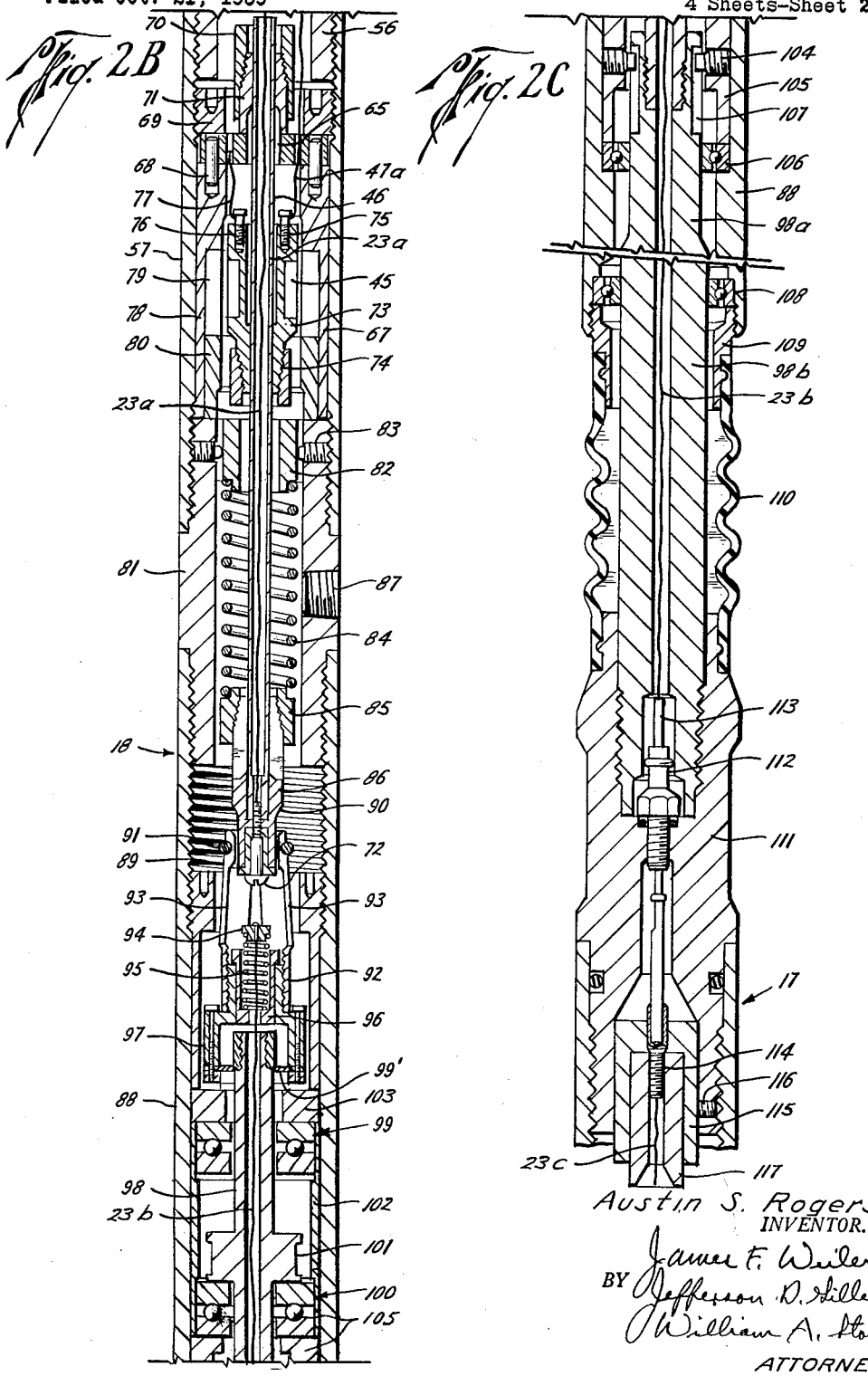
Figure 3:
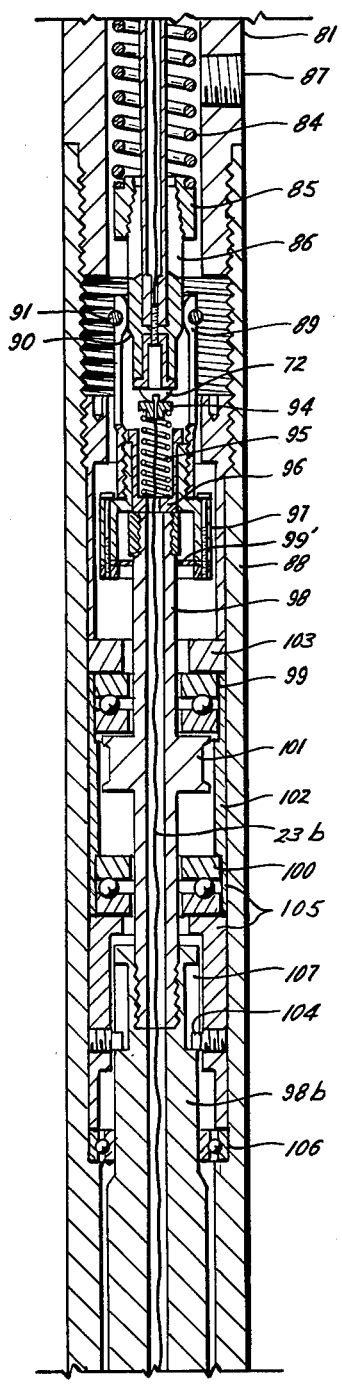
Figure 4:
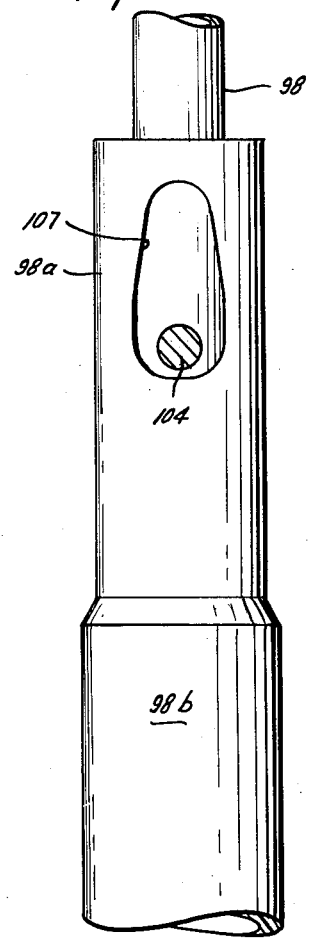

Other and further objects, features and advantages will be apparent from the following description of presently preferred embodiments of apparatus of the invention, taken in conjunction with the accompanying drawings, where like reference characters refer to like parts throughout the several views, which views illustrate a presently preferred apparatus of the invention which is useful in the method of the invention, and where FIGURE 1 is an elevational view, partly in section, illustrating apparatus according to the invention in place in pipe in a well bore having drill collars stuck in the well bore, FIGURE 2A is a sectional elevational view illustrating the upper portion of the sensing unit of the instrument illustrated in FIGURE 1, FIGURE 2B is a continuation of FIGURE 2A and illustrates the intermediate portion of the sensing unit, FIGURE 2C is a continuation of FIGURE 2B and illustrates the lower portion of the sensing unit, FIGURE 3 is a sectional elevational view illustrating the sensor tube and associated parts in position for taking a reading, FIGURE 4 is a fragmentary, elevational view illustrating a limit pin arrangement for aligning the instrument prior to applying force to the pipe and taking a reading, and FIGURE 5 is a diagrammatic, elevational view illustrating the apparatus of FIGURE 1 and including a circuit diagram of the downhole instrument and the surface equipment.

Referring now to the drawings, and particularly to FIGURE 5, the downhole instrument is generally indicated by the reference numeral 10 and includes the downhole oscillator 11 connected at its upper end to a collar locator 12 which is connected by means of the slip joint 13 to the sinker bars 13' which are connected to the cable head or connection 14 connected to the cable 15 by which the instrument 10 is lowered into and raised from the well bore.

Disposed below the downhole oscillator 11 are the upper bow spring and lower bow spring assemblies 16 and 17, respectively, which are connected to each end of the sensing unit 18.

The function of the bow spring assemblies 16 and 17, of course, is to fixedly connect the sensing unit 18 to spaced points of the inner wall of the pipe.

In the instrument illustrated in FIGURE 5, a combination stuck pipe locator and means for impacting a joint of free pipe are secured together to form a combination instrument so that once the stuck point is located, the free pipe above may be disconnected all in one trip of the instrument in the well bore. To this end, in the arrangement illustrated in FIGURE 5, a string shot assembly 19 and detonator 20 are connected by a safety joint or sub 21 to the lower bow spring assembly 17.

Referring now to the surface equipment, a D.C. power source 22 is connected by means of the conductors 23 and 24 through the reversing switch 25 to the cable 15 and to the input tranformer 26, which, in turn, is connected by the conductors 27 and 28 to an amplifier and mixer 29.

An A.C. power source 30 is connected by the electrical conductors 31 and 32 to the D.C. power source 22 and by the conductors 33 and 34 to the amplifier and mixer 29.

A beat frequency oscillator 35 is connected to the amplifier and mixer 29 by the conductors 37 and 38 to produce a beat frequency with the incoming signal from the tank circuit of the oscillator 11 to provide more sensitive results. In this connection, it has been found that a beat frequency of from 1 to 1000 cycles off the zero beat, that is, the difference in frequency of the oscillator 11 in the downhole instrument 10 and the local oscillator 35 is satisfactory.

Suitable indicating or measuring means is provided to give a reading or indication, for example, the frequency difference meter 36.

It will be understood that any desired power source, amplifier and indicator arrangement may be utilized as desired. Since all these surface elements are conventional, any desired elements may be used, no further description thereof is deemed necessary.

Referring now to the downhole circuit, the electrical conductor 23 extends in the cable 15 in the usual manner, through the sinker bars 13', the slip joint 13 and is connected to the collar locator by the conductor 41. It is noted, that essentially the collar locator 12 includes the coil 42 connected to ground, which coil sets up a magnetic field which is linked to the pipe in which it passes. Accordingly, as the coil passes collars or tool joints, the magnetic characteristics of the field are changed and an indication is given at the surface.

The downhole oscillator 11, as shown, includes the pentode 43, the plate of which is supplied positive potential from the electrical conductor 23 in the cable 15 by the electrical conductor 44. The coil 45 of the sensor unit 18 is disposed about a sensor tube 46 and is connected by the conductors 47 and 48 through the grid resistor 49 to the grid of the tube 43 and the condenser 50, which is in parallel with the coil 45.

No further detailed description of the electron-coupled oscillator is given as any desired satisfactory oscillator may be used. In the arrangement illustrated, however, the electron-coupled oscillator generates radio-frequency current so long as positive potential is supplied to the plate of the pentode 43. While any desired frequency may be utilized, it has been found that a frequency between 20 and 50 kilocycles is satisfactory.

It is noted that the tank circuit provides a radiation or magnetic field from the coil 45 which is linked to the sensor tube 46. Accordingly, any change in the permeability of the sensor tube 46, such as by applying a force to it to torque it, alters the magnetic characteristics of the field which are indicated on the frequency difference meter 36 at the surface as previously mentioned.

With reference still to FIGURE 5, a rectifier 51 is provided at the lower portion of the electrical conductor 23 to which is connected a detonator 20 so that when positive potential is being provided in the conductor 23, which serves to cause the oscillator 11 to function, no current will pass through the rectifier 51 and, accordingly, the detonator 20 will not be actuated. Upon reversing the polarity, however, by means of the reversing switch 25 at the surface, negative potential will be supplied in the conductor 23 and the rectifier 51 will permit current to be provided to the detonator 20 thereby actuating the detonator and thus detonating the primacord 19.

Thus, it is not possible to set off or detonate the explosive 19 unless the reversing switch 25 is reversed so that the rectifier 51 will permit current to be supplied to the detonator 20 thereby detonating the explosive 19, here indicated as primacord.

Referring now to details of structure of the sensor unit 18, as shown in FIGURES 2A–C, 3 and 4, and first with reference to FIGURE 2A, a sub or connector 52 is provided which is threadedly or otherwise connected to the lower end 53 of the upper bow spring assembly 16. The upper end of the sub 52 houses the coaxial connector 54 which provides an electrical connection for the conductor 47 from the oscillator 11, not shown in this view, and for the shooting lead 23. The connector 54 includes, as is conventional, coaxially spaced tubular connectors 122 and 124 which are adapted to be connected to an electrical plug (not shown). Connector 122 and 124 are also connected as shown to leads 23 and 47. A suitable insulating material 126 insulates the connectors 122 and 124 from each other and from the sub 52.

While any desired coaxial connector may be used, the one illustrated is quite satisfactory in practice and is secured by the set screws 55 to the upper inner enlarged portion 120 of the sub or connector 52.

The sub 52 is threaded into an upper connecting member of what might be termed a fluid seal sub 56, which in turn is threaded into the upper end of the body 57 of the sensor unit 18.

Disposed in the upper end of the fluid seal sub 56 is a generally cylindrical body member 58 which is provided with the passage 59 at its upper end which is in communication with the passage 60 in the sub 52 for receiving the electrical conductors 23 and 47.

The body member 58 is provided with a pair of branch passages 61 and 62 into which are threaded the electrical connectors 63 and 64, respectively, to which the lower ends of the electrical conductors 47 and 23 are connected so that the upper ends of the extensions thereof, that is the electrical conductors 47a and 23a are connected thereto to provide an extension of these electrical conductors.

It is noted that suitable packings are provided in the subs 52 and 56, and with respect to the electrical connectors 63 and 64 to provide a fully packed off and sealed upper end to the body 57 of the sensor unit 18 and at the same time provide a continuation of the electrical conductors 47 and 23 but at the same time permitting the instrument to be assembled and disassembled in initially making the instrument and in making repairs and replacements.

No further description of the coaxial connection 54, top sub 52 and fluid seal sub 56, together with the electrical connections is given as any preferred arrangement may be utilized preferably provides a fluid seal within the body 57.

Referring now to FIGURE 2B, the upper body member 57 houses the upper portion of the sensor tube 46 which is rigidly connected to the upper body member 57 by means of the collet 65 disposed about the sensor tube 46, the collet being held rigid with respect to the core sleeve 67 by means of the pins 68. The collet 65 is held in position by means of the threaded lock nut 69 and the collet nut 70 firmly holds the collet projections 71 firmly against the sensor tube 46.

It is noted since the upper end of the sensor tube 46 is rigidly secured to the upper body member 57, which is in turn rigidly secured to the sub 56 (FIGURE 2A), which in turn is fixed to the upper bow spring assembly 16 by means of the upper sub 52, that when the upper bow spring assembly 16 is fixed with relation to the inside of the pipe being tested, the upper end of the sensor tube 46 is similarly fixed.

It is noted that the sensor tube 46 is hollow and provides a passageway for the shooting lead or electrical conductor 23a which is connected at its lower end to the electrical contact 72.

Also rigidly secured to the sensor tube 46 is the sensor coil 45 which is carried by the coil carrier 73 secured to the sensor tube 46 by means of the coil form collet 74.

The coil carrier 73 includes a pair of electrical contacts 75 and 76, the former having the tank line 47a connected thereto and the latter being connected by the conductor 77 to the upper collet 65 which serves as a ground.

Disposed within the upper body portion 57 is what might be termed a core sleeve 67 into the upper portion of which is disposed the ferromagnetic core 79 and held in place by means of the retainer 80 which abuts against the upper end of the filler sub 81. Core 79 surrounds coil 45 and thus increases the efficiency of the coil 45 and acts to shield the magnetic field of the coil from the pipe to which the instrument is inserted. Furthermore, the ferromagnetic case of the downhole instrument 10 also acts as a shield shielding the coil 45 in the sensor unit 46 from the pipe.

By the arrangement illustrated it is noted the coil 45 sets up a magnetic field which is linked to a portion of the sensor tube 46. It is also noted that there is no relative movement between the coil 45 and sensor tube 46 inasmuch as the present invention does not depend upon the presence or absence of relative movement between the sensor elements of the unit. If desired, however, the coil 45 may be mounted on the inside of the upper body member 57, in which event, there would be some slight relative movement between the sensor tube 46 and the coil 45. Even under these circumstances, however, the relative movement between the parts is not that which provides the highly accurate and sensitive results, but it is the load applied to the sensor tube 46, such as torque, which varies the magnetic characteristics of the magnetic field from the coil 45 by which the highly accurate results are obtained.

It has been found that best results are obtained by providing a predetermined amount of torque in the sensor tube 46 in that an insensitive condition exists when the sensor tube 46 is in or near a relaxed position, but the sensor tube 46 is very sensitive as torque is applied in either direction. Thus, by applying a constant amount of torque to the sensor tube 46 by a spring 84, it becomes very sensitive to changes in torque and is also linear. To this end, the sensor tube 46 extends through the generally tubular filler sub or connection 81, and passes through the upper annular anchor member 82 which is secured to the upper end of the filler sub 81 by means of the set screws 83, and is provided with the loading spring 84 which is welded to or otherwise rotatably secured to the annular anchor member 82 and also welded at its bottom portion against the upper end of the lower collet nut 85 threaded to the lower collet 86. The loading spring 84 which is secured at each end is held in torque and thus maintains the sensor tube in a sensitive condition at all times, that is, under a predetermined amount of torque.

The filler tube 81 includes the threaded filler plug 87 so that the instrument may be completely filled with a suitable insulator grease or oil, for example, a light silicone grease. Thus, the entire sensor unit 11 is packed with a suitable grease or oil which advantageously excludes well fluid from the instrument.

As best seen in FIGURE 2B, the lower end of the filler sub 81 is threadedly connected to the upper end of the intermediate generally tubular body member 88, in the upper end of which is disposed a clutch member 89 which is movable into engagement with the upper clutch member 90. The clutch element 89, here shown disengaged, is yieldingly forced inwardly by the circumferentially extending spring 91, the clutch elements 89 extending from the sleeve 92 by means of the arms 93. Thus, a friction clutch is provided which will slip if too much torque is applied to the sensor tube 46.

An electrical contact 94 is provided which is engageable by the electrical contact 72 upon relative movement of these members toward each other, the electrical contact 94 being yieldingly maintained in an upward position by means of a compression spring 95 bearing against the stop nut 96 disposed within the support assembly 97 and secured to the upper end of the mandrel 98 by flexible members 99 whereby the support assembly 97 is flexibly supported for urging the clutch into engagement.

Thus, with the parts in the position illustrated in FIGURE 2B, that is the clutch elements 89 and 90 out of engagement, relative movement is permitted between the thrust mandrel 98 and the sensor tube 46; however, when the clutch elements 89 and 90 are in engagement, a fixed connection is provided between the thrust mandrel 98 and the sensor tube 46. As mentioned previously, however, the friction clutch elements 89 and 90 permit slipping between the thrust mandrel 98 and sensor tube 46 upon application of too much torque or tension to prevent damage to the sensor tube 46.

In order that the clutch elements 89 and 90 do not have to be maintained in rigid alignment, a universal connection is provided between the upper end of the mandrel 98 and the clutch arms 93. To this end, a diaphragm spring or resilient disc 99' connects the arms 93 to the thrust mandrel 98. Since the instrument is so sensitive, advantageously the diaphragm spring 99' reduces the longitudinal movement caused by longitudinal elongation of the pipe. It has been found that a reduction of 10 to 1 brings the sensitivity of the sensor tube 46 to within normal working limits of drill pipe.

The thrust mandrel 98 is mounted for limited longitudinal and rotational movement in the body member 88 when in nonoperating position. To this end, a pair of antifriction thrust assemblies, generally indicated by the reference numerals 99 and 100 are provided for supporting the thrust mandrel 98 in this limited movement. Further to this end, the thrust mandrel 98 is externally enlarged at 101 to limit the longitudinal movement between the lower antifriction thrust bearing 100 and the upper antifriction thrust bearing 99. The upper and lower antifriction thrust bearing 99 and 100, respectively, are separated by a spacer sleeve 102, the upper antifriction thrust bearing 99 being separated from the support assembly 97 by the spacer ring 103, the bottom of sleeve 102 seating on the upper end of limit pin sleeve 105.

Referring now to FIGURE 2C, a pair of limit pins are threadedly or otherwise secured to the limit pin sleeve 105, the upper enlarged portion of which engages the underside of the lower thrust bearing 100 (FIGURE 2B) and the lower end of which rests on what might be termed an upper radial bearing assembly 106.

It is noted that the thrust mandrel 98, in the form illustrated in the drawings, is made up of two sections threaded together, the lower section being designated by the reference numeral 98a which, at its upper end is provided with a pair of generally elongated downwardly diverging slots 107 as best seen in FIGURE 4. The mandrel 98 and 98a is free to move a distance longitudinally limited by the thrust bearings 99 and 100 and is permitted to rotate a limited distance to place the instrument in an operating and nonoperating condition as previously mentioned and as explained in more detail later herein.

Referring again to FIGURE 2C, the thrust mandrel 98a is externally enlarged below the upper radial bearing assembly 106, as designated at 98b, and engages a lower radial bearing assembly 108. The purpose of the upper and lower radial bearing assemblies 106 and 108, respectively, is to permit rotation of the mandrel 98b the limited distance as mentioned with a minimum of friction.

Threaded into the lower end of the body member 88 is a tubular bearing retainer 109 which also serves as a connection to a flexible separator member 110 which is secured at its lower end to the bottom sub or connector 111 which, in turn, is connected to the bottom bow spring assembly 17.

The lower end of the thrust mandrel 98b is threadedly or otherwise secured to the lower sub or connector 111 so that the thrust mandrel 98, 98a and 98b is fixed to the bow spring assembly 17.

Referring again to FIGURE 2B, it is noted that the firing lead 23a is connected to the upper electric contact 72, and that the firing lead, in effect, continues from the lower electric contact 94 and is designated by the reference character 23b. The thrust mandrel 98, 98a and 98b, is provided with a passage through which the shooting lead 23b extends and is secured at its upper end to an electric contact member which provides a fluid seal so that none of the insulating grease inserted into the tool in the plug 87 and the filler sub 81 will leak out the lower end.

The lower portion of the electric contact 113 is connected and slidably fits in the upper end of the electric contact 114 in the bottom bow spring assembly to which a continuation of the shooting lead, here designated by the reference character 23c, extends to the detonator 20 and explosive 19 (FIGURE 5).

A retainer insulating sleeve 115 is secured in the lower end of the lower sub 111, such as by the screw 116 and also provided is an electrical contactor sleeve 117.

In use, the sensor unit 18 is assembled as illustrated in FIGURES 2A–C, and is assembled along with the other components as illustrated in FIGURE 5. The sensor unit 18 is evacuated of air and filled with a suitable insulating light grease to prevent well fluids from entering the tool, as previously mentioned.

Referring now to FIGURE 1, preferably, the instrument is lowered in the pipe P in the well bore B and, preferably, is lowered to the bottom of the string of pipe P, which has the drill collars C at its lower end to which a bit, not shown, is connected. As shown in FIGURE 1, the drill collars C are stuck in the well bore B at the cave-in point S.

Before taking a reading, the entire assembly is pulled up, the drag of the lower drag or bow spring 17 extending the sensor unit 18 to the position illustrated in FIGURES 2A–C, that is, with the limit pins 104 in the upper portion of the slots 107, (FIGURE 2C), the clutch elements 89 and 90 disengaged and the electrical contact 72 and 94 disengaged. This upward movement causes the bow spring assemblies 16 and 17 to become oriented by the limit pins 104 moving into the upper tapered portion of the slots 107 (FIGURE 4).

The entire assembly is then lowered until the stop member 101 engages the upper thrust bearing 99 placing the limit pins 104 adjacent and in the middle of the bottom of the slots 107 (FIGURE 4). This operation of the limit pins thus insures that any inadvertent torque placed on the instrument by the rotation of the bow springs 16 and 17 as the instrument is lowered is now removed and the instrument is aligned.

This limit pin arrangement also permits the torque which would normally be applied by the drag assemblies 16 and 17 to the flexible separator 110 as the apparatus is lowered to be eliminated. It is also noted that after alignment the limit pins 104 do not engage the sides of the slots 107 and are in a free position so as to take a reading.

The pipe P is then torqued at the surface, by conventional drilling equipment, not shown, preferably in a direction tending to tighten the threaded connections. If desired, the pipe P may be worked up and down to the extent possible while applying the torque to insure that the torque is worked down to the lowest free point of the pipe P.

The applied torque causes the lower drag or bow spring assembly 17 to twist relative to the upper bow spring or drag spring assembly 16 causing the limit pins 104 to move in the slots 107 but not engage the slots 107 so that the torque is entirely applied to the sensor tube 46. At this time, there is a rigid connection between the lower bow spring assembly 17, the thrust mandrel 98, a, b, the sensor tube 46, the clutch elements 89 and 90 being engaged, and the upper drag or bow spring assembly 16 by virtue of the upper end of the sensor tube 46 being rigidly connected thereto. Thus, the sensor tube 46 is fixed with respect to the pipe P and the force applied to the pipe P is applied to the sensor tube 46 by means of the arrangement illustrated and previously described.

By applying positive potential to the plate of the electron-coupled oscillator 11, a magnetic field is set up in the coil 45 about the sensor tube 46. This magnetic field, of course, is linked with the sensor tube and torque or any force applied to the sensor tube 45, such as tension, causes a change in the permeability of the tube which changes the magnetic characteristics of the field which is reflected back into the tank circuit and is indicated at the indicator 36.

Since the force applied to the pipe P will only extend down to the free portion, and will not appreciably extend into the stuck portion S (FIGURE 1), upon moving the assembly up the pipe P to the point illustrated in FIGURE 1, readings will be given which clearly indicate the stuck point S. Moving from successive point to point in the pipe P is accomplished by merely raising the instrument 10 by raising the cable 15 and then lowering the cable 15 a foot or two, then applying force to the pipe P and noting the indicator 36. This may be repeated as often as desired.

The sensor tube 46 is a highly permeable tube-like member or rod, and preferably is torque loaded by the spring 84, so that very little torque applied to it will considerably vary the magnetic characteristics of the field. In this way, highly satisfactory and accurate indications are given of the stuck point of the drill collar C which heretofore could not be obtained with reliability and accuracy in view of the very small movement of the relatively thick walled drill collar C.

In the arrangement illustrated in FIGURES 1 and 5, and referring to FIGURE 1, after the stuck point has been indicated, the assembly is raised until the explosive assembly 19 is preferably inside the first joint of free pipe above the stuck portion. The instrument is then lowered a few inches so that the electric contacts 72 and 94 (FIGURE 2B) are engaged to complete the shooting lead down to the detonator 20. By then lifting the pipe P to take the superimposed load of the pipe off the free joint and applying torque in a direction tending to unscrew the joints, the reversing switch 25 is reversed thereby detonating the detonator 20 which detonates the explosive 19 which thus impacts the interior of the threaded joint thereby either disconnecting the joint or initiating disconnection.

The assembly may then be removed from the pipe P and the disconnected free portion of the pipe P then removed from the well bore.

The stuck portion of the pipe P, such as the drill collar C, may then be fished out of the well bore by any preferred fishing operation.

It will be understood, of course, that it is unnecessary to run the combination of the stuck pipe locator and the impacting device 19 at the same time and that these may be run separately if so desired. In practice, however, it is advantageous to run the combination of the two as it only requires one trip in the well bore to both locate the stuck point and disconnect the free pipe.

Any desired impacting means may be used. The use of an explosive charge is generally disclosed in Kinley Patent No. 2,305,261, issued December 15, 1942. Other means of providing the necessary impact, of course, may be utilized, such as the hydraulic surge method disclosed in the Mason Patent No. 2,361,558, issued October 31, 1944 or by using what is known as an "explosion type" bailer such as disclosed in the Gates Patent No. 2,139,076, issued December 6, 1938.

At present, however, the explosive method, and particularly the use of "primacord" to provide the necessary impact to the connection to be unthreaded is preferred.

The mode of operation of the device, however, includes the steps of fixing a rigid elongate highly permeable magnetizable member, such as a steel rod or tube, to spaced points in pipe in a well bore, providing a magnetic field and linking the magnetic field to the permeable member, applying force to the pipe, which force is applied to the permeable member which thereby changes its permeability which changes the magnetic characteristics of the magnetic field, and instrumentally indicating the change in the magnetic characteristics at the surface. Preferably, the permeable or sensor tube or element should be preloaded, such as torqued so that it is highly sensitive at all times.

While the operation does not depend upon any relative movement of the permeable member with respect to the field, that is the magnetic field may move with the permeable element, the field may remain stationary, if so desired. In other words, it is not any relative movement between the magnetic field and the permeable or sensor element by which the advantageous results of the present invention are obtained, but is the change in the permeability of the sensor element which affects the magnetic characteristics of the field by which these results are obtained.

In the apparatus of the invention, any desired oscillator may be used, which preferably should be a downhole oscillator, and any type sensor element may be used so long as it is highly permeable magnetic member. Any means may be utilized to fix the sensor element to the walls of the pipe P, for example, magnetic elements and the like instead of the bow spring assemblies 16 and 17.

In addition, if desired, the apparatus may be used going into the hole instead of coming out. Also, if desired the sinker bars 13′, the slip joint 13, flexible assembly 97 and collar locator 12 may be eliminated. In use, however, the inclusion of these components has been satisfactory.

It will be understood, of course, that any magnetizable or magnetic member may be fixed to spaced portions of the walls of the pipe in the well bore, and a force may be applied to the pipe to stress a portion thereof above the stuck point, and the magnetic characteristics of the member may then be surveyed to determine the location of the stuck point.

In the appended claims it will be understood that when the magnetic member, permeable member, sensor element, tube and the like is referred to as "rigid" that it need only be rigid or include a rigid element fixed to the pipe when actually functioning to give a desired reading and that it may be made up of relatively movable elements which can be fixed against relative rotation to the extent necessary to obtain the desired reading or indication, for example, as described and illustrated in the presently-preferred apparatus of the invention.

The present invention therefore is well suited and adapted to attain the objects and ends and has the advantages mentioned as well as others inherent therein.

In the apparatus of the present invention, while presently preferred examples of the invention have been given for the purposes of disclosure, many changes in details of structure and arrangement of parts may be made in the apparatus of the invention which are within the spirit of the invention and the scope of the appended claims.

What is claimed is:

1. An apparatus for determining the point at which pipe is stuck in a well bore comprising, a rigid magnetically permeable member, first releasably connecting means connected to the member for releasably connecting the member inside of and to the wall of the pipe, clutch elements one of which is connected to said permeable member, said clutch elements being actuated on movement relative to each other, second releasably connected means spaced from said first means and connected to the second of said clutch elements for releasably connecting said member to the inside of and at a point of the wall of the pipe spaced from the first means, means electrically coupled to said permeable member for measuring changes in the permeance of said member caused by a change in the stress applied to said member whereby when force is applied to said pipe and transmitted to said permeable member the location of the stuck point may be determined.

2. An apparatus for determining the point at which pipe is stuck in a well bore comprising, an elongate tubular body, a rigid elongate highly magnetically permeable element fixedly disposed in said body, first means connected to the body for releasably connecting said body and element to the wall of the pipe, a thrust mandrel arranged for limited longitudinal and rotational movement with respect to the body, engageable clutch elements on said permeable element and the thrust mandrel arranged for engagement on longitudinal movement, second means connected to the thrust mandrel for releasably connecting said mandrel to the wall of the pipe spaced from the first means, and electrical means electrically coupled to said permeable element for measuring changes in the permeance of said element.

3. The invention of claim 2 including means electrically shielding the permeable element from the pipe.

4. The invention of claim 2 including means for applying a stress to the permeable member.

5. The invention of claim 2 including orienting means comprising a V-shaped slot and pin, one of which is connected to the body and the other of which is connected to the thrust mandrel for orienting the first and second releasably connecting means.

6. An apparatus for determining the point at which pipe is stuck in a well bore comprising, a rigid magnetically permeable member, means for applying a fixed stress to said permeable member, means for releasbly fixing the permeable member inside of and to spaced points of a wall of a stuck pipe, an electrical test circuit electrically linked to the permeable member, and indicating means at the surface in the electrical test circuit whereby on applying force to the pipe the force is applied to the permeable member thereby giving an indication of the stuck point of the pipe.

7. An apparatus for locating a point at which pipe is stuck in a well bore comprising, an elongate tubular magnetically permeable element, an electrical test circuit including an inductor magnetically coupled to said element, said element adapted to be lowered into the pipe, means for electrically shielding said element from the pipe, releasable connecting means adapted to be connected to spaced points of the element and releasably connected to the pipe to spaced points of the wall of the stuck pipe, and indicating means electrically connected to said inductor whereby when said element is connected to spaced portions of the wall and a force is applied to the stuck pipe the indicating means will indicate changes in the permeability of the permeable element thereby locating the stuck point.

8. The invention of claim 7 including spring means connected to the permeable element and applying a fixed stress to said element.

9. An apparatus for determining the point at which pipe is stuck in a well bore comprising, an elongate tubular body, a rigid elongate magnetically permeable element fixedly disposed in said body, first means connected to the body for releasably connecting said body and element to the wall of the pipe, a mandrel arranged for limited longitudinal and rotational movement with respect to the body and arranged for engagement with said element, second means connected to the mandrel for releasably connecting said mandrel to the wall of the pipe spaced from the first means, electrical means electrically coupled to said permeable element for measuring changes in the permeance of said element, spring means connected to and applying a fixed stress to said permeable element, and orienting means including a V-shaped slot and pin, one of which is connected to the body and the other of which is connected to the mandrel for orienting the first and second releasably connecting means and thus the permeable element.

References Cited in the file of this patent

UNITED STATES PATENTS

| | | |
|---|---|---|
| 2,422,806 | Silverman et al. | June 24, 1947 |
| 2,530,309 | Martin | Nov. 14, 1950 |
| 2,550,964 | Brooks | May 1, 1951 |
| 2,686,039 | Bender | Aug. 10, 1954 |
| 3,006,186 | Berry | Oct. 31, 1961 |